United States Patent
Ide et al.

[11] Patent Number: 5,884,849
[45] Date of Patent: Mar. 23, 1999

[54] NOZZLE FOR LUBRICATION

[75] Inventors: Masaaki Ide, Komaki; Hiromichi Mizuno, Aichi-ken, both of Japan

[73] Assignee: Aoyama Seisakusho Co., Ltd., Nagoya, Japan

[21] Appl. No.: 814,113

[22] Filed: Mar. 10, 1997

[30] Foreign Application Priority Data

Mar. 12, 1996 [JP] Japan ..................... 8-054945

[51] Int. Cl.$^6$ ..................... B05B 1/14
[52] U.S. Cl. ..................... 239/548; 239/600
[58] Field of Search ..................... 239/548, 600; 285/285.1, 286.1; 248/56; 264/259, 274

[56] References Cited

U.S. PATENT DOCUMENTS 5,165,881  11/1992  Wicen ..................... 264/274 X

Primary Examiner—Andres Kashnikow
Assistant Examiner—Steven S. Ganey
Attorney, Agent, or Firm—Frishauf, Holtz, Goodman, Langer & Chick P.C.

[57] ABSTRACT

Disclosed is a nozzle for lubrication, which comprises a substantially oval metallic mounting plate having a bolt-inserting hole at one end of the mounting plate and a plug body-inserting hole with plural protruded pieces at the other end of the mounting plate. A plug body made of a fiber-reinforced thermoplastic is insert-molded so that the protruded pieces of the plug body-inserting hole are embedded in a flange portion formed at a lower portion of the plug body and nozzle holes with different phases are at an upper portion of the plug body.

15 Claims, 3 Drawing Sheets

NOZZLE FOR LUBRICATION

BACKGROUND OF THE INVENTION

1. Field of the Invention

This invention relates to a nozzle for lubrication, which lubricates a chain driving a cam or the like of an engine for an automobile.

2. Prior Art

In the prior art, as shown in FIGS. 4 and 5, in a nozzle for lubrication, which lubricates a chain or the like of an automobile engine, a substantially oval metallic mounting plate 12 having a bolt-inserting hole 12a at one end thereof and a plug body-inserting hole 12b at the other end thereof, respectively is mounted at the lower portion of a metallic plug body 11 having upper and lower nozzle holes 10, 10 with different phases provided at an upper portion thereof, respectively, via said plug body-inserting hole, and further said plug body and said metallic mounting plate are integrated by soldering. However, in order to form the nozzle holes 10, 10 of the plug body 11, it is required that said plug body has predetermined thickness, so that it is difficult to lighten the weight of said nozzle for lubrication, which results in a problem as parts for an automobile in which lightening of weight by gram unit is required. Further, since said metallic mounting plate is soldered to said plug body, time is required for production, and productivity is lowered to cause increase in cost. Moreover, as shown in FIG. 4, the lower portion of the plug body 11 is soldered in a state that said portion is engaged with the plug body-inserting hole 12b of the metallic mounting plate 12. Therefore, when solder is peeled off by influence of vibration of an engine, said plug body is rotated to change an oil-ejecting position, which results in the problems that lubrication failure is caused or said plug body itself is dropped from said metallic mounting plate.

SUMMARY OF THE INVENTION

An object of the present invention is to provide a nozzle for lubrication, which is light and inexpensive and can be mass-produced easily.

The present invention relates to a nozzle for lubrication, which comprises:

- a substantially oval metallic mounting plate having a bolt-inserting hole at one end thereof and a plug body-inserting hole with plural protruded pieces at the other end thereof; and
- a plug body made of a fiber-reinforced thermoplastic which is insert-molded so that the protruded pieces of said plug body-inserting hole are embedded in a flange portion formed at a lower portion thereof, having nozzle holes with different phases at an upper portion thereof.

DESCRIPTION OF THE PREFERRED EMBODIMENTS

Figure 1:
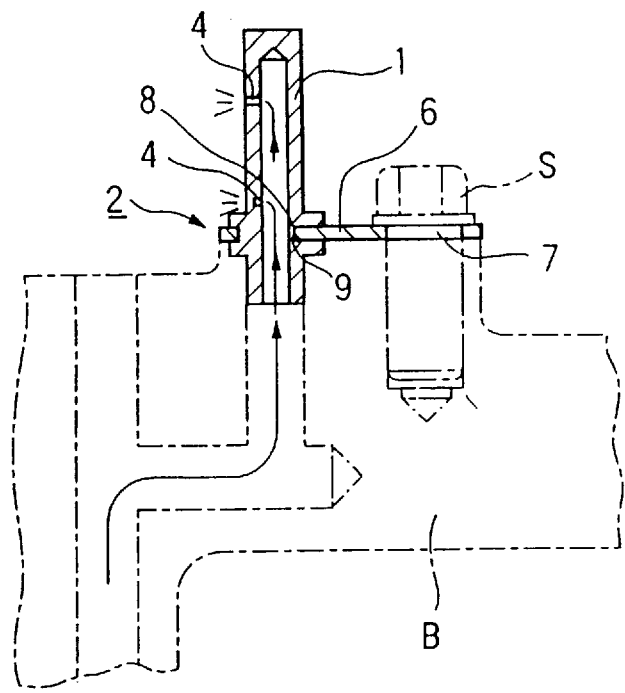
FIG. 1 is a sectional view showing a preferred embodiment of the nozzle for lubrication of the present invention.
Figure 2:
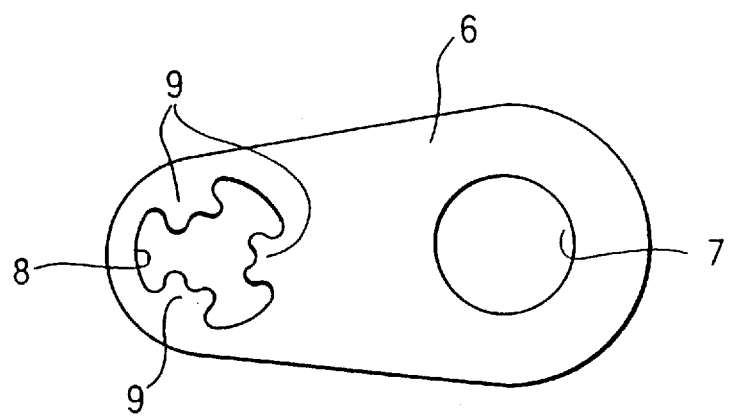
FIG. 2 is a plane view showing a metallic mounting plate of a preferred embodiment of the nozzle for lubrication of the present invention.
Figure 3:
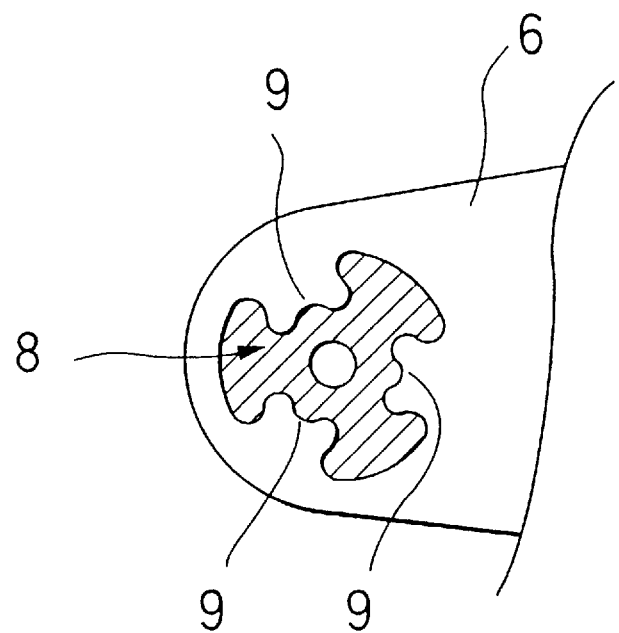
FIG. 3 is a schematical plane view showing a charging range of a resin into a plug body-inserting hole of a metallic mounting plate of a preferred embodiment of the nozzle for lubrication of the present invention.
Figure 4:
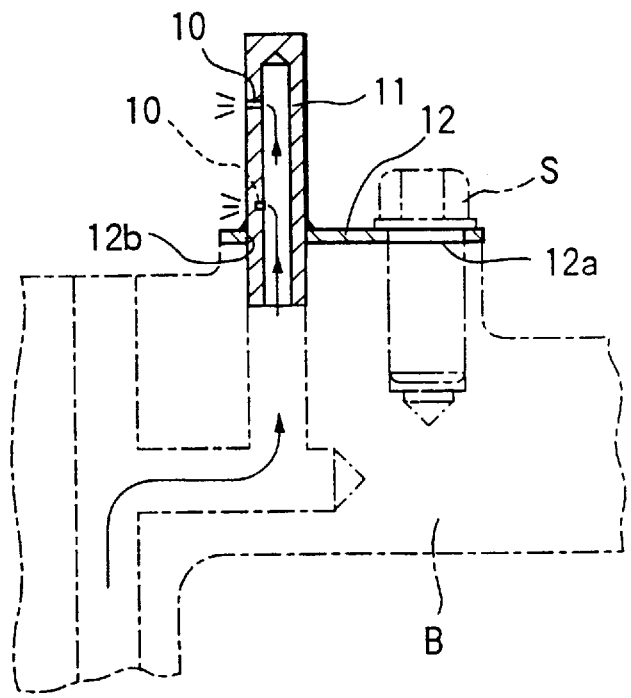
FIG. 4 is a sectional view of a conventional nozzle for lubrication.
Figure 5:
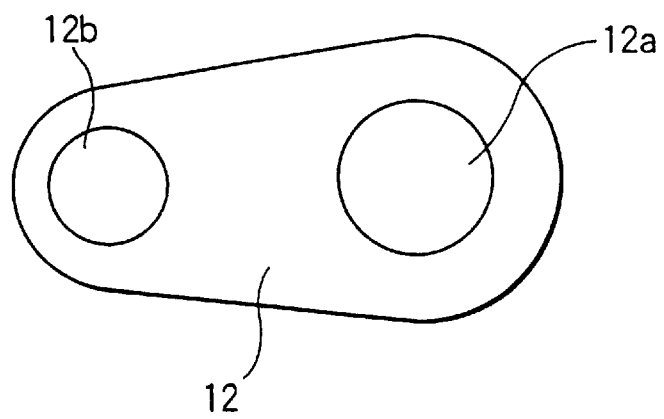
FIG. 5 is a plane view of a metallic mounting plate of a conventional nozzle for lubrication.

The present invention is explained in detail based on a preferred embodiment (see FIGS. 1 to 3). The present invention is not limited by the embodiments shown in FIGS. 1 to 3.

1 is a tubular plug body made of a fiber-reinforced thermoplastic, which is a composite comprising a glass fiber and a thermoplastic selected from the group consisting of polyphenylene slufide (PPS), polyether sulfone (PES), polyamides (Nylon 66 and Nylon MXD6), polyacetal (POM) and so forth, having excellent heat resistance and strength. As the thermoplastic, Nylon MXD6 is preferably used. In this embodiment, the composite (trade name: RENY® 1002F, manufactured by Mitsubishi Engineering Plastic co., Ltd.) comprising Nylon MXD6 of 70% by weight and a glass fiber of 30% by weight was used from such viewpoints as a cheaper manufacturing cost and a good performance of the product. At the lower portion of said plug body, a flange portion 2 is formed, and at the upper portion thereof, nozzle holes 4, 4 communicating with the hollow portion of said plug body and having different phases by about 80° are provided at an interval of about 10 mm in the shaft direction of said plug body. 6 is a substantially oval metallic mounting plate, and a bolt-inserting hole 7 is provided at one end thereof and a plug body-inserting hole 8 is provided at the other end thereof, respectively. The above flange portion 2 comprises two doughnut-like plate-shaped members which are concentric with said plug body-inserting hole and have a slightly larger diameter than that of said plug body-inserting hole. These plate-shaped members are formed so that the upper and lower surfaces of said metallic mounting plate are sandwiched therebetween, in the course of producing said plug body by applying an insert molding method in which a mold having a profile transferring the external form of said plug body being imaginary to integrate said metallic mounting plate to the predetermined position of said plug body and making a solid portion having a profile transferring the internal form of said nozzle holes and a hollow portion of said plug body attach to the predetermined position of said mold is used, said fiber-reinforced thermoplastic in a plasticized state is injected into the cavity of said mold in which said metallic mounting plate is set so that said plug body-inserting hole is positioned at a predetermined position of said plug body, and following steps as well known in the conventional injection molding method, i.e., a dwelling, a cooling and a mold releasing are carried out in order. In this insert molding of said plug body, as a result of charging a major portion of said plug body-inserting hole of said metallic mounting plate (a portion except for the hollow portion which becomes oil passage, of said plug body, i.e., a portion with oblique lines in FIG. 3. This portion also constitutes a part of said plug body.) with said fiber-reinforced thermoplastic, said metallic mounting plate is integrated with said plug body via said flange portion (which contributes to prevention of dropping of said metallic mounting plate from said plug body and prevention of loosening of said metallic mounting plate) of said plug body and said fiber-reinforced thermoplastic (which contributes to prevention of rotation of said metallic mounting plate) with which said plug body-inserting hole of said metallic mounting plate is charged.

The protruded pieces 9 of said plug body-inserting hole are formed so that the width of base portions thereof are narrower than the width of tip end portions thereof for the reason mentioned below. Since the thermoplastic has shrink characteristics in steps of a dwelling and a cooling, when said protruded pieces are formed so as to have a relation of the width of the base portions≧the width of the tip end portions, after completion of molding, gaps between said protruded pieces are generated accompanied with shrinkage of the thermoplastic, so that integrality of said plug body and said metallic mounting plate is impaired (said metallic mounting plate is loosened as a phenomenon thereof).

Further, at least one side portion of each protruded piece 9 of said plug body-inserting hole may be bent about 90° relative to the plane of said protruded piece (not shown in the figures. The bending direction may be either upward or downward). By this embodiment, an effect of suppressing rotation is enlarged.

In the nozzle for lubrication thus constituted, when the lower portion of the plug body 1 is watertightly engaged with the oil passage of an engine block B, the metallic mounting plate 6 integrated with the plug body 1 touches the upper surface of the engine block B. After positioning of the bolt-inserting hole 7 of the metallic mounting plate 6 and a tapped hole of the engine block B is carried out, a bolt S is screwed into the bolt-inserting hole 7 to fix the plug body 1 to the engine block B. When an engine is actuated after the plug body 1 is mounted on the engine block B as described above, oil is flowed through the oil passage by an oil pump of the engine, oil flowing from an opening at the bottom of the plug body 1 is ejected from the nozzle holes 4, 4 with different phases of the plug body 1 to lubricate a chain for driving a cam, which is the same as in the prior art. However, the plug body 1 comprises the fiber-reinforced thermoplastic, so that its strength is not lowered by oil of high temperature, and also said plug body is extremely light, so that it is not easily influenced by vibration of the engine. Moreover, said plug body and said metallic mounting plate are tightly integrated, and also said plug body is firmly fixed to the engine block B via said metallic mounting plate, so that lubrication failure is not caused by rotating said plug body to shift an oil-ejecting position.

As clearly seen from the above explanation, in the nozzle for lubrication of the present invention, a plug body and a metallic mounting plate are integrated by insert molding, and a plug body-inserting hole has protruded pieces. Therefore, as compared with the case where soldering is carried out, the number of production steps can be reduced, so that said nozzle can be mass-produced inexpensively. Further, it is not necessary to carry out machining of the plug body, so that productivity can be more improved. The plug body comprises a fiber-reinforced thermoplastic, so that its strength can be sufficiently retained against oil of high temperature, and the weight of said nozzle can be lightened, so that said nozzle has a large number of advantages which are extremely effective as parts for an automobile.

Thus, the present invention provides a nozzle for lubrication the problems in the art of which have been solved, and therefore greatly contributes to development of the art.

We claim:

1. A nozzle for lubrication, which comprises:

a substantially oval metallic mounting plate having a bolt-inserting hole at one end thereof and a plug body-inserting hole with plural protruded pieces at the other end thereof; and a plug body having a hollow portion made of a fiber-reinforced thermoplastic which is insert-molded so that the protruded pieces of said plug body-inserting hole are embedded in a flange portion formed at a lower portion thereof, having nozzle holes which communicate with said hollow portion, with different phases at an upper portion thereof.

2. The nozzle according to claim 1, wherein the fiber-reinforced thermoplastic is a composite comprising Nylon MXD6 and a glass fiber.

3. The nozzle according to claim 2, wherein the blending ratio of the nylon MXD6 and the glass fiber is 70/30 as weight percentage.

4. The nozzle according to claim 3, wherein the protruded pieces of the plug body-inserting hole are formed so that the width of base portions thereof are narrower than the width of tip end portions thereof.

5. The nozzle according to claim 4, wherein the number of the protruded pieces of the plug body-inserting hole is 3.

6. The nozzle for lubrication according to claim 4, wherein at least one side portion of each protruded piece is bent about 90° relative to the plane of said protruded piece.

7. The nozzle for lubrication according to claim 6, wherein the number of the protruded pieces of the plug body-inserting hole is 3.

8. The nozzle according to claim 2, wherein the protruded pieces of the plug body-inserting hole are formed so that the width of base portions thereof are narrower than the width of tip end portions thereof.

9. The nozzle according to claim 8, wherein the number of the protruded pieces of the plug body-inserting hole is 3.

10. The nozzle for lubrication according to claim 8, wherein at least one side portion of each protruded piece is bent about 90° relative to the plane of said protruded piece.

11. The nozzle for lubrication according to claim 10, wherein the number of the protruded pieces of the plug body-inserting hole is 3.

12. The nozzle according to claim 1, wherein the protruded pieces of the plug body-inserting hole are formed so that the width of base portions thereof are narrower than the width of tip end portions thereof.

13. The nozzle according to claim 12, wherein the number of the protruded pieces of the plug body-inserting hole is 3.

14. The nozzle for lubrication according to claim 12, wherein at least one side portion of each protruded piece is bent about 90° relative to the plane of said protruded piece.

15. The nozzle for lubrication according to claim 14, wherein the number of the protruded pieces of the plug body-inserting hole is 3.

* * * * *